United States Patent [19]

Ohishi et al.

[11] Patent Number: 5,054,911
[45] Date of Patent: Oct. 8, 1991

[54] LIGHT WAVE DISTANCE MEASURING INSTRUMENT OF THE PULSE TYPE

[75] Inventors: Masahiro Ohishi; Fumio Ohtomo, both of Tokyo, Japan

[73] Assignee: Kabushiki Kaisha Topcon, Japan

[21] Appl. No.: 453,904

[22] Filed: Dec. 20, 1989

[30] Foreign Application Priority Data

Dec. 30, 1988 [JP] Japan .................. 63-335282

[51] Int. Cl.⁵ .............................................. G01C 3/08
[52] U.S. Cl. ........................................................ 356/5
[58] Field of Search ........................................ 356/4, 5

[56] References Cited

U.S. PATENT DOCUMENTS

| | | | |
|---|---|---|---|
| 3,752,582 | 8/1973 | Troll et al. | 356/5 |
| 4,068,952 | 1/1978 | Ebert et al. | 356/5 |
| 4,413,904 | 11/1983 | Hamada | 356/5 |
| 4,531,833 | 7/1985 | Ohtomo | 356/5 |
| 4,560,271 | 12/1985 | Fumio | 356/5 |
| 4,621,107 | 6/1985 | Chaborski et al. | 356/5 |
| 4,770,526 | 9/1988 | Manhart et al. | 356/5 |

Primary Examiner—Mark Hellner
Attorney, Agent, or Firm—Brumbaugh, Graves, Donohue & Raymond

[57] ABSTRACT

A light wave distance measuring instrument uses a light receiving diode for receiving both light from a light source diode coupled via an internal light passage and light from the light source diode coupled via an external light passage. A beam splitter separates light pulses from a single source diode to supply light pulses for both internal and external passages. A reference signal is sampled using detected signals representing the timing of received internal reference light pulses and external measurement light pulses to provide first and second signals with phase difference representing measured distance. These signals are processed in a CPU for calculating distance with reduced errors due to frequency drift. By introducing an optical fiber delay medium, reflected light pulses are separated in time from the internal reference pulses so that these pulses can be used directly for differential time determination purposes and the measurement of distances to objects close to the measuring instrument is made possible.

6 Claims, 12 Drawing Sheets 5,054,911

LIGHT WAVE DISTANCE MEASURING INSTRUMENT OF THE PULSE TYPE

BACKGROUND OF THE INVENTION

This invention relates to a light wave distance measuring instrument for measuring a reflection turnaround time of a pulse of light to calculate a distance between a body of the instrument and an object, and more particularly to a light wave distance measuring instrument of the pulse type which is capable of removing an influence of any drift.

A conventional light wave distance measuring instrument of the pulse type measures a period of time required for a pulse of light to go from a body of the light wave distance measuring instrument and come back from a corner cube to measure a distance between the instrument body and the corner cube. However, since the velocity of light is very high, a high technique is required for direct measurement of such turnaround time. Thus, a light passage for reference is provided in the inside of the body of the light wave distance measuring instrument, and a period of time from a reference to reception of light based on an internal electric signal is measured for each of the internal reference light passage and an external light passage for distance measurement, and then a measured value obtained from the internal reference light passage is subtracted from a measured value obtained from the external distance measurement light passage to determine a reflection turnaround time to measure a distance between the instrument body and the corner cube. In other words, the conventional light wave distance measuring instrument of the pulse type is constructed such that instability factors occurring in the inside of the light wave distance measuring instrument may be removed by subtracting a measured value obtained from the internal reference light passage. Then, a light chopper which is a mechanical light passage changing over means is employed for such changing over between the light passages.

However, with such a conventional light wave distance measuring instrument of the pulse type as described above, measurement for the external distance measurement light passage and measurement for the internal reference light passage involve an interval of time from an electric reference signal to actual emission of a pulse of light from a light emitting diode. Such interval of time from a reference signal to actual emission of light is considered to involve such factors as (A) a delay time and a drift from generation of a reference signal to a light emitting element driving circuit, (B) a delay time and a drift of the light emitting element driving circuit, and (C) a response time and a drift of the light emitting element.

Those factors can be reduced by subtracting a measured value obtained from the internal reference light passage from a measured value obtained from the external distance measurement light passage. However, since the conventional light wave distance measuring instrument employs a chopper which is a mechanical light passage changing over means, it has a problem that a time is required for such changing over operation and, if the frequency of changing over operations increased, then the measurement time increases accordingly. Further, the changing over frequency of the chopper must necessarily be set to several Hz, which results in production of a time difference in measurement between the internal reference light passage and the external distance measurement light passage. Consequently, there is a problem that an influence of such drifts as listed above cannot be eliminated.

DETAILED DESCRIPTION OF THE INVENTION

Figure 1:
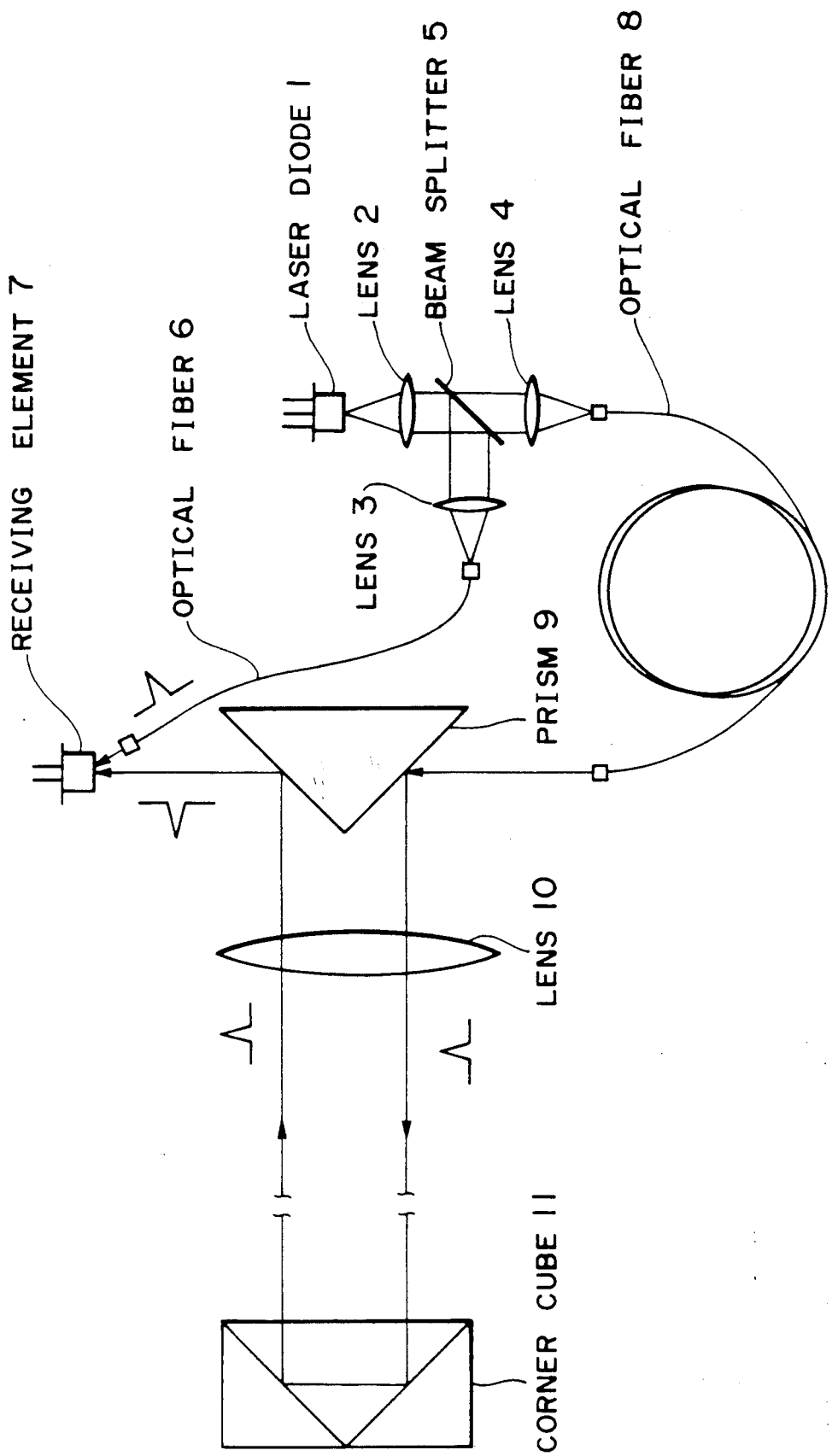
FIG. 1 is a diagrammatic representation showing general construction of a light wave distance measuring instrument of a preferred embodiment of the present invention.
Figure 2:
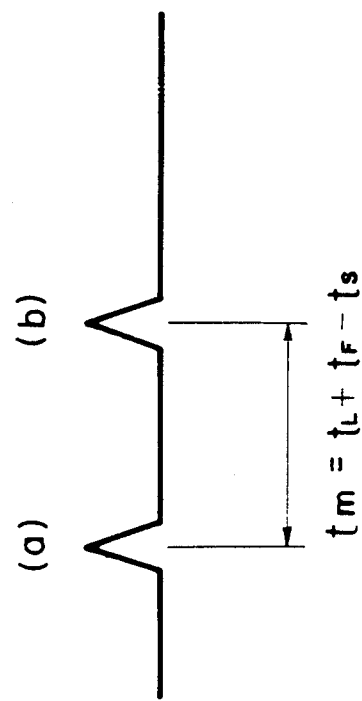
FIG. 2 is a diagram showing an internal reference light pulse and an external distance measurement light pulse.

Several embodiments of the present invention will be described below with reference to the drawings. FIG. 1 shows an optical system of a light wave distance measuring instrument according to a preferred embodiment of the present invention, and FIG. 2 shows a signal received by a light receiving means of the light wave distance measuring instrument shown in FIG. 1.

As shown in FIG. 1, the light wave distance measuring instrument of the present embodiment includes a laser diode 1, a set of lenses 2, 3 and 4, a beam splitter 5, an optical fiber 6 for an internal light passage, a light receiving element 7, a delaying optical fiber 8, a prism 9, and another lens 10. A corner cube 11 serving as an object is disposed at a location spaced from the body of the light wave distance measuring instrument and has a function to reflect a pulse of light.

The laser diode 1 is a pulse laser diode which can generate a pulse wave having a comparatively high peak power and a duty ratio of 0.01% or so. The beam splitter 5 splits a beam of light. The light receiving element 7 may be any element which can receive a pulse beam of light emitted from the laser diode 1. The delaying optical fiber 8 is one of delaying means for delaying a light signal. It is to be noted that preferably a GI fiber is employed for the delaying optical fiber 8.

With the optical system having such a construction as described above, a light pulse emitted from the laser diode 1 is changed into a parallel beam of light by the lens 2 and then split into two beams of light by the beam splitter 5. One of the two beams of light which is reflected by the beam splitter 5 is then condensed by the lens 3 and then advances in the optical fiber 6 for an internal light passage. Thus, an internal reference light passage is constructed wherein a light pulse is received by the light receiving element 7 by way of the optical fiber 6 for an internal light passage. Then, the light pulse is converted into an electric signal by the light receiving element 7. Meanwhile, the other beam of light which has passed the beam splitter 5 is then condensed by the lens 4 and then advances in the delaying optical fiber 8. The beam of light delayed by the delaying optical fiber 8 is then reflected by the prism 9, passes through the lens 10 and is thus projected from the body of the light wave distance measuring instrument. The light pulse is then reflected by the corner cube 11 disposed at a measurement position and then passes through the lens 10 whereafter it is reflected by the prism 9 and received by the light receiving element 7, thereby forming an external distance measurement light passage. Then, the light pulse is converted into an electric signal by the light receiving element 7.

In the present embodiment, since the delaying optical fiber 8 is interposed in the external distance measurement light passage, if the interval of time by which a light pulse is delayed by the delaying optical fiber 8 is set to a greater value than the width of a light pulse, then the internal reference light pulse and the external distance measurement light pulse can be separated in time on the light receiving element 7. As illustrated in FIG. 2, a time difference $t_m$ between two pulses can be represented as $$t_m = t_L + t_F - t_S \quad (1)$$

where $t_L$ is a period of time required for a light pulse to go from the body of the light wave distance measuring instrument to the corner cube 11 and then come back to the instrument body, $t_F$ is a period of time required for a light pulse to pass through that portion of the external distance measurement light passage which is in the inside of the instrument body, and $t_S$ is a period of time required for a light pulse to pass through the internal reference light passage.

Since $t_F$ and $t_S$ are known values, the equation (1) above can be rewritten as $$t_L = t_m - t_F - t_S \quad (2)$$

and the distance L between the body of the light wave distance measuring instrument and the corner cube 11 can be calculated in accordance with an equation $$L = (\tfrac{1}{2}) \cdot t_L \cdot C \quad (3)$$

where C is the velocity of light.

In other words, as seen from FIG. 2, a light pulse (a) obtained from the internal reference light passage can be used as a reference signal without employing an internal electric signal as a reference signal for measurement.

Subsequently, optical distance measurement employing a light pulse (a) obtained from the internal reference light passage as a reference signal will be described using practical values. Here, if it is assumed that the width of a light pulse is 50 nsec, then the delay time for separating a light pulse of the internal reference light passage should be 100 nsec or so. Accordingly, if the length of a portion of the external light measuring light passage in the inside of the instrument body except the delaying optical fiber 8 and the length of the internal reference light passage are ignored, then the length l of the delaying optical fiber 8 is given as follows:

$$\begin{aligned} l &= C \times 100 \text{ nsec} \times (1/n) \\ &= 3 \times 10^8 \times 100 \times 10^{-9} \times (1/1.5) \\ &= 20 \text{ m} \end{aligned}$$

where C is the velocity of light, and n is a refraction index of the delaying optical fiber 8.

Then, as the distance to be measured increases, the difference between receiving points of time of a light pulse from the internal reference light passage and another light pulse from the external distance measurement light passage increases. For example, where the distance to be measured is 10 km, then the time difference $t_m$ is given as $$t_m = (10 \text{ km}/C) \times 2 + 100 \text{ nsec} \doteq 66.7 \ \mu\text{sec}$$

The result is equivalent to performing of changing over of reception between a light pulse (a) from the internal reference light passage and another light pulse (b) from the external distance measurement light passage in about 66.7 μsec. Compared with a changing over frequency of several Hz available with an ordinary mechanical chopper, the optical system of the present embodiment can realize changing over of a very high speed 1,000 times or so the speed available with such mechanical chopper. Accordingly, an influence of a drift of the light receiving system including the light receiving element 7, an amplifier and so forth can be reduced. Further, as the distance to be measured increases, the effect of such reduction in drift of the light receiving element decreases, but since the practical range of the distance to be measured by a light wave distance measuring instrument is several tens km or so, a sufficiently high drift reducing effect can be attained.

Subsequently, an example of electric system of the present embodiment will be described with reference to FIG. 3. It is to be noted that the basic principle of a light wave distance measuring instrument of the pulse type is disclosed in detail in two patent applications filed by the present applicants (U.S. patent application Ser. No. 372,630 Ser. No. 372,609).

First Example of Construction

Figure 3:
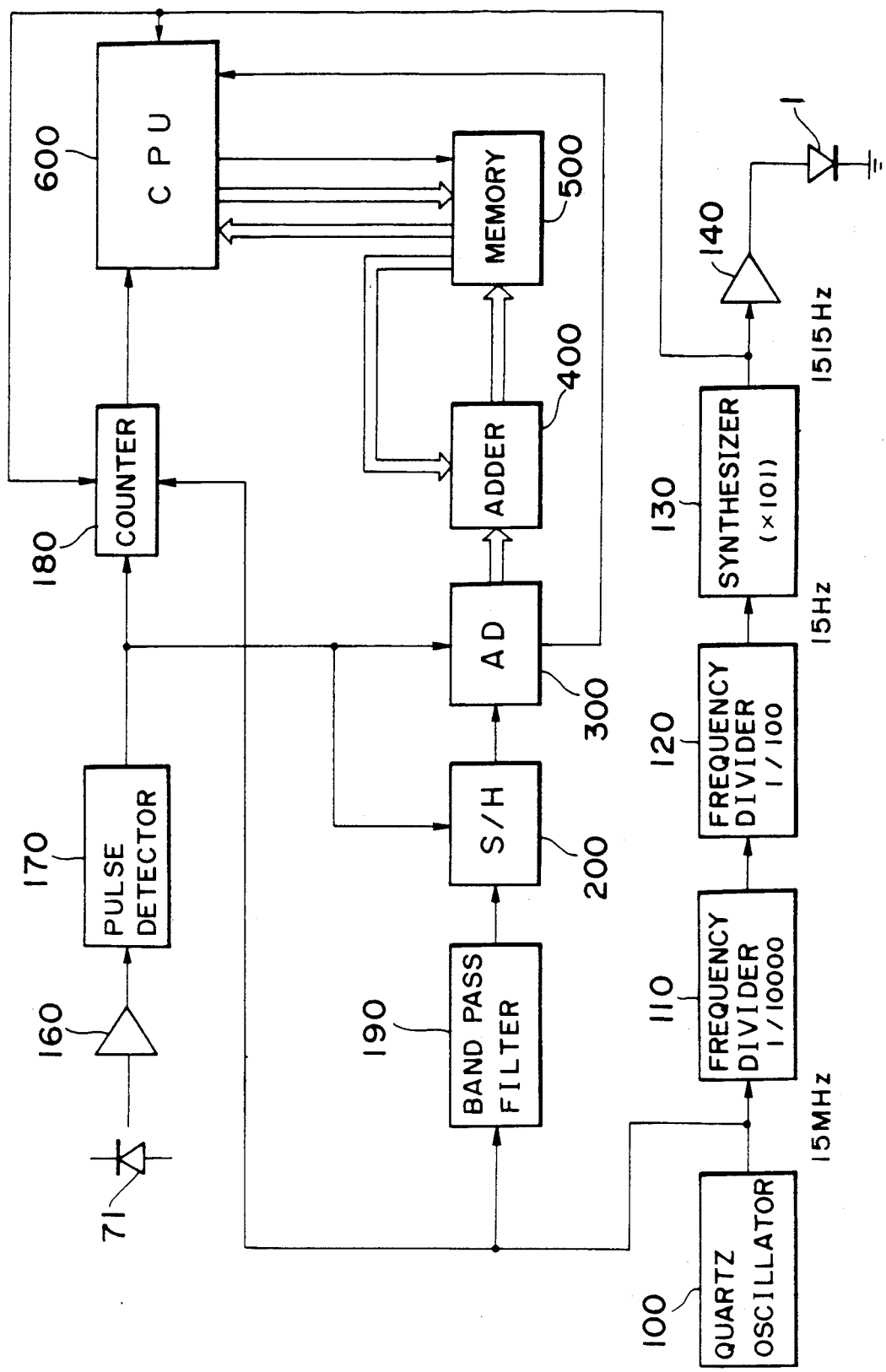
FIG. 3 is a block diagram showing a first example of construction of the light wave distance measuring instrument.

FIG. 3 shows an example of construction wherein the delay time by the delaying fiber 8 is longer than a period of time required for conversion by an analog to digital converter. The electric system of the example of construction includes a quartz oscillator 100, a first frequency divider 110, a second frequency divider 120, a synthesizer 130, a laser diode 1, a laser diode driver 140, an APD 71, an amplifier 160, a pulse detector 170, a counter 180, a band pass filter 190, a sample holding circuit (S/H) 200, an analog to digital converter 300, an adder 400, a memory 500, and a central processing unit (CPU) 600.

The quartz oscillator 100 is one of reference signal generating means and generates a reference signal of 15 MHz. Such reference signal is frequency divided to 1/10,000 by the first frequency divider 110 and then further frequency divided to 1/100 by the second frequency divider 120 to produce a signal of 15 Hz. The signal of 15 Hz is multiplied by 101 by the synthesizer 130 to produce a signal of about 1,515 Hz. It is to be noted that output signals of the first frequency divider 110, second frequency divider 120 and synthesizer 130 are binary signals. Then, the driver 140 drives the laser diode 1 in a pulse-like manner in accordance with an output signal of the synthesizer 130. Accordingly, the laser diode 1 emits a beam of light in the form of pulses having a period of 1/1.515 KHz. Meanwhile, the output of the synthesizer 130 is also fed to the counter 180 and the CPU 600. The output of the synthesizer 130 acts upon the counter 180 as a resetting signal while it acts upon the CPU 600 as a discriminating signal of a received pulse. In particular, a reception pulse received after a fixed interval of time from the synthesizer 130 is judged as a reception pulse which has passed the internal reference light passage, and another pulse received after then is judged as an external distance measurement light pulse which has passed through the delaying fiber. A light pulse emitted from the laser diode 1 passes the optical system shown in FIG. 1 and is then received by the APD 71. The APD 71 is one of the light receiving element 7 and is a diode wherein a deep bias is applied to a pn junction to induce an avalanche multiplication so that a gain may be obtained. The APD 71 receives such a set of light pulses as shown in FIG. 2 which include a light pulse which has passed the internal reference light passage shown in FIG. 1 and another light pulse which has passed the external distance measurement light passage. Each of the light pulses is converted into an electric signal by the APD 71, amplified suitably by the amplifier 160 and waveform shaped by the pulse detector 170 to obtain a worked electric signal which is easy to handle electrically. It is to be noted that a signal developed from the pulse detector 170 acts as a starting or stopping signal for the counter 180. In particular, a signal at the timing of the internal reference light pulse (a) shown in FIG. 2 makes a starting signal, and a signal at the timing of the external distance measurement light pulse (b) makes a stopping signal. The counter 180 counts clocks of 15 MHz of the quartz oscillator 100 and forwards a result of its count to the CPU 600. The count data is used as rough measurement data after a known delay time by the delaying fiber 8 is subtracted therefrom. Meanwhile, the output of the pulse detector 170 is sent also to the sample holding circuit 200 and the analog to digital converter 300. Thus, at first, sample holding takes place in response to a signal at the timing of the internal reference light pulse (a) shown in FIG. 2. In particular, the sample holding circuit 200 sample holds, at a timing of an output signal of the pulse detector 170, a sine wave into which the output signal of the quartz oscillator 100 is converted by the band pass filter 190. After completion of analog to digital conversion, the analog to digital converter 300 outputs a conversion completion signal to the CPU 600. Then, the digital signal converted from the analog signal is stored at a predetermined address of the memory 500. After then, sample holding and so forth of the output signal of the band pass filter 190 are carried out in response to a signal at the timing of the external distance measurement light pulse (b) shown in FIG. 2. In particular, similarly as in the case of the signal at the timing of the internal reference light pulse (a), sample holding and analog to digital conversion are carried out, and digital data obtained is stored into the memory 500. Here, the memory address in which a digital signal obtained is to be stored may be determined such that it may range, for example, from address 1 to address N for internal reference light pulses while it ranges from address N+1 to address 2N for external distance measurement light pulses.

Such a sequence of operations as described above is repeated each time a light pulse is emitted in the frequency of f=1.515 Hz. It is to be noted that the operations of sample holding, analog to digital conversion and storage in memory must be executed between the timing of the internal reference light pulse (a) and the timing of the external distance measurement light pulse (b). Accordingly, the following condition must necessarily be satisfied.

$$t_F - t_S > t_{AD} + t_{S/H} + t_{memory} \tag{5}$$

where $t_{AD}$ is a period of time required for analog to digital conversion, $t_{S/H}$ is a settling time of a sample holding IC (integrated circuit), and $t_{memory}$ is a period of time required to store data in the memory. Meanwhile, the phase difference between a set of pulses received (an internal reference light pulse and an external distance measurement light pulse) and an output signal of the band pass filter 190 is equal to a 1/N period (N is an integer, and N=101 in the present example) for each measurement. Accordingly, N=101 measurements make measurement for one cycle. However, in measurement after measurement for the first cycle, data obtained are added to the data of the preceding cycle by the adder 400 and stored into the same address as in the first cycle. Consequently, such data are averaged finally.

Figure 4:
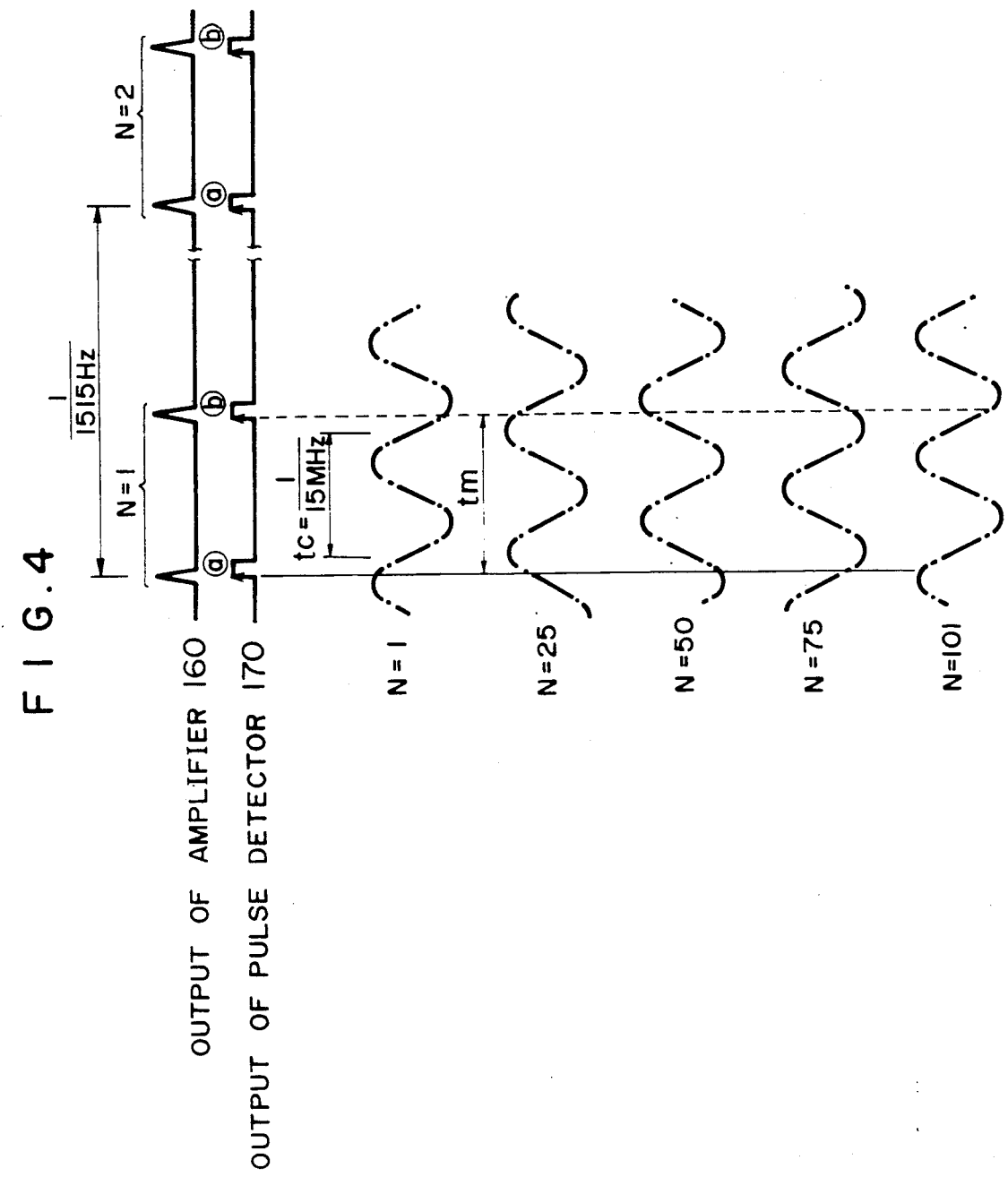
FIG. 4 is a graph illustrating a positional relationship between a set of pulses and an output signal of a band pass filter.
Figure 5:
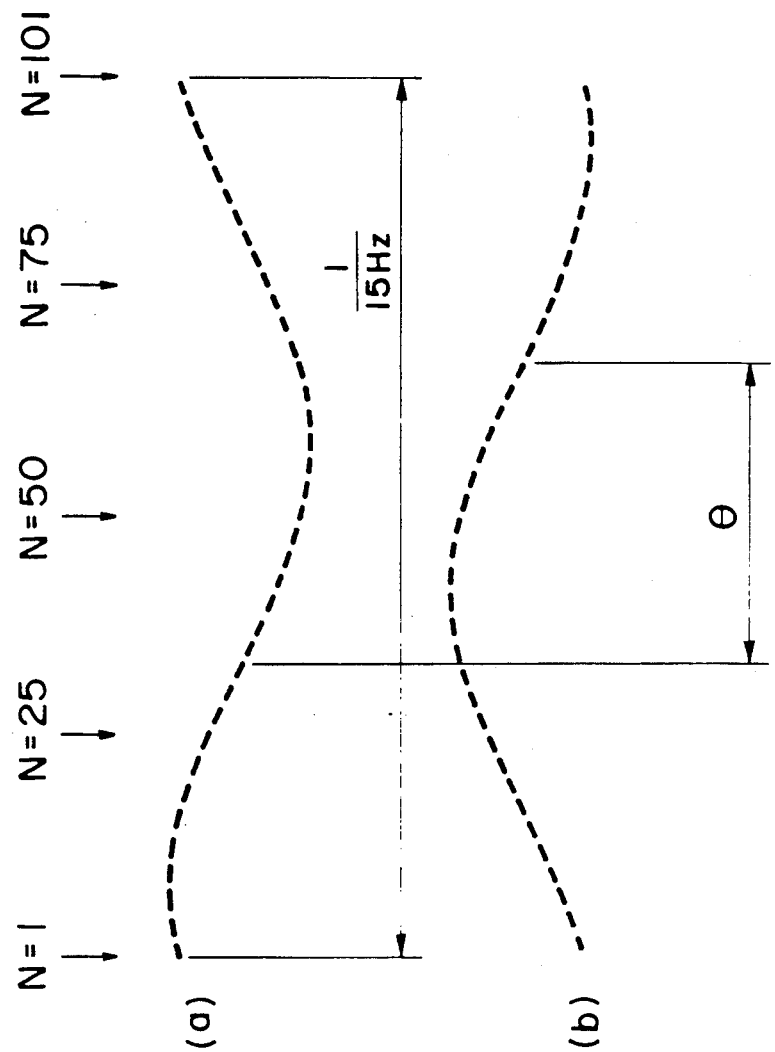
FIG. 5 is a graph showing a signal sample held with a light pulse.

Subsequently, the positional relationship between each set of pulses and an output signal of the band pass filter 190 when a set of pulses received is taken as a reference will be described with reference to FIG. 4. Here, signals in the case of N=25, 50, 75 and 101 are shown for comparison with a signal in the case of N=1 in order to illustrate a change in phase clearly. On the other hand, FIG. 5 shows signals sample held at the timing of the internal reference light pulse (a) of each set of pulses ranging from 1 to 101 and similarly shows signals sample held at the timing of the external distance measurement light pulse (b). Accordingly, points in FIG. 5 correspond to data of digital signals in the memory 500 while the axis of abscissa corresponds to an address of the memory 500. Here, one cycle makes a signal of $$\frac{1}{1.515 \text{ Hz}} \times 101 = \frac{1}{15 \text{ Hz}} \tag{6}$$

Subsequently, the time difference $t_m$ between the signal of the internal reference light pulse (a) of FIG. 4 and the signal of the external distance measurement light pulse (b) can be represented as $$t_m = t_c \left( n + \frac{\phi}{2\pi} \right) \quad (7)$$

where n is an integer, $t_c$ is a clock time of the quartz oscillator 100, and $\phi$ is a fraction time represented in phase when $t_c$ is taken as one cycle. In this instance, $\phi$ in the equation (7) above is equal to $\theta$ of FIG. 5. In other words, the phase difference in FIG. 4 is multiplied by $$\frac{15 \text{ MHz}}{15 \text{ Hz}} = 1 \times 10^6 \text{ times} \quad (8)$$

Accordingly, $t_m$ can be interpolated by calculating $\theta$ of FIG. 5 from data in the memory 500. A value of a length corresponding to the length of the delaying optical fiber 8 and so forth subtracted from distance data obtained in this manner is determined as a fine measurement value, and a measurement distance value can be obtained by combining the fine measurement value with the rough measurement value.

Second Example of Construction

Figure 6:
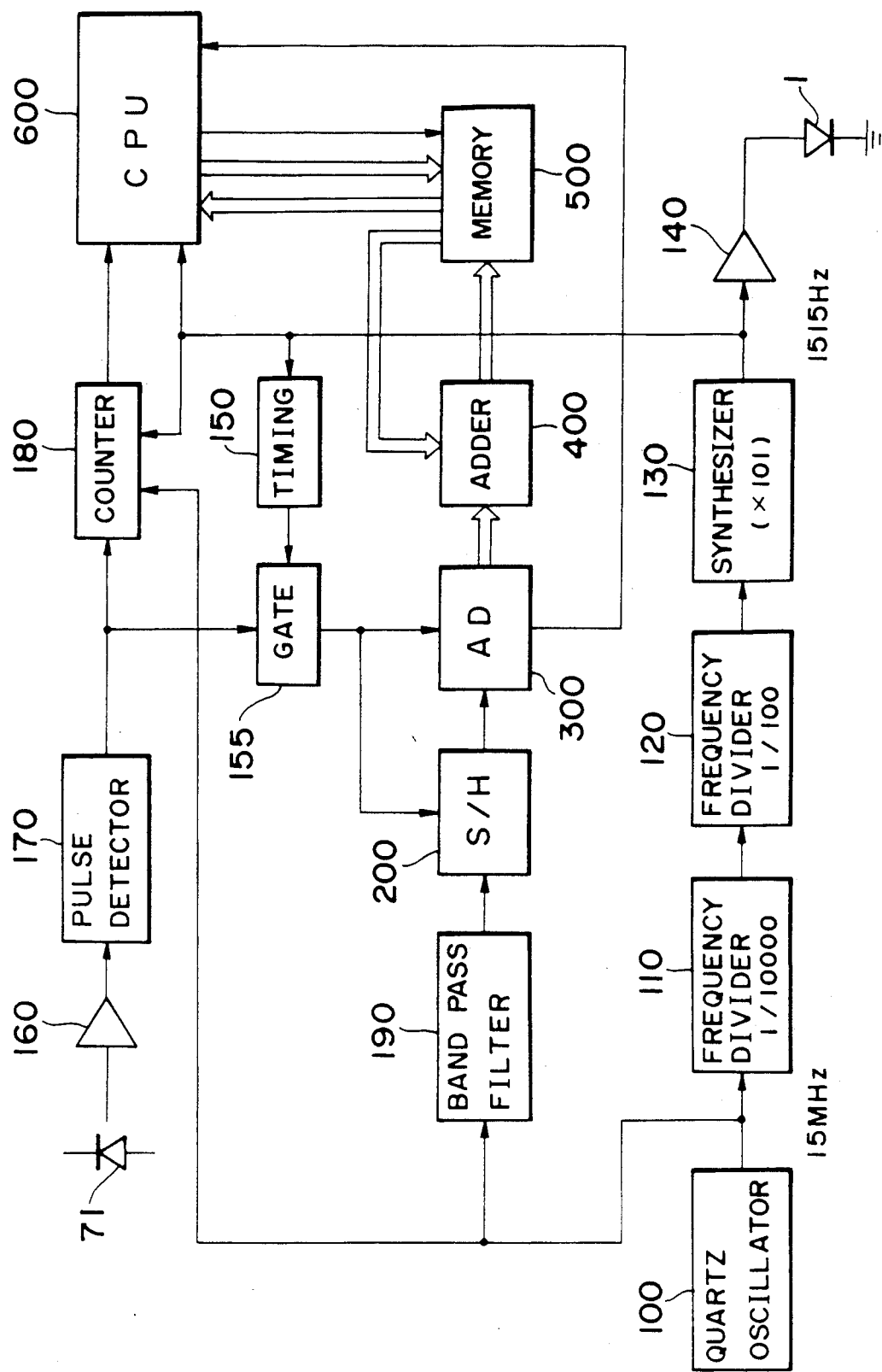
FIG. 6 is a block diagram showing a second example of construction of the light wave distance measuring instrument.
Figure 7:
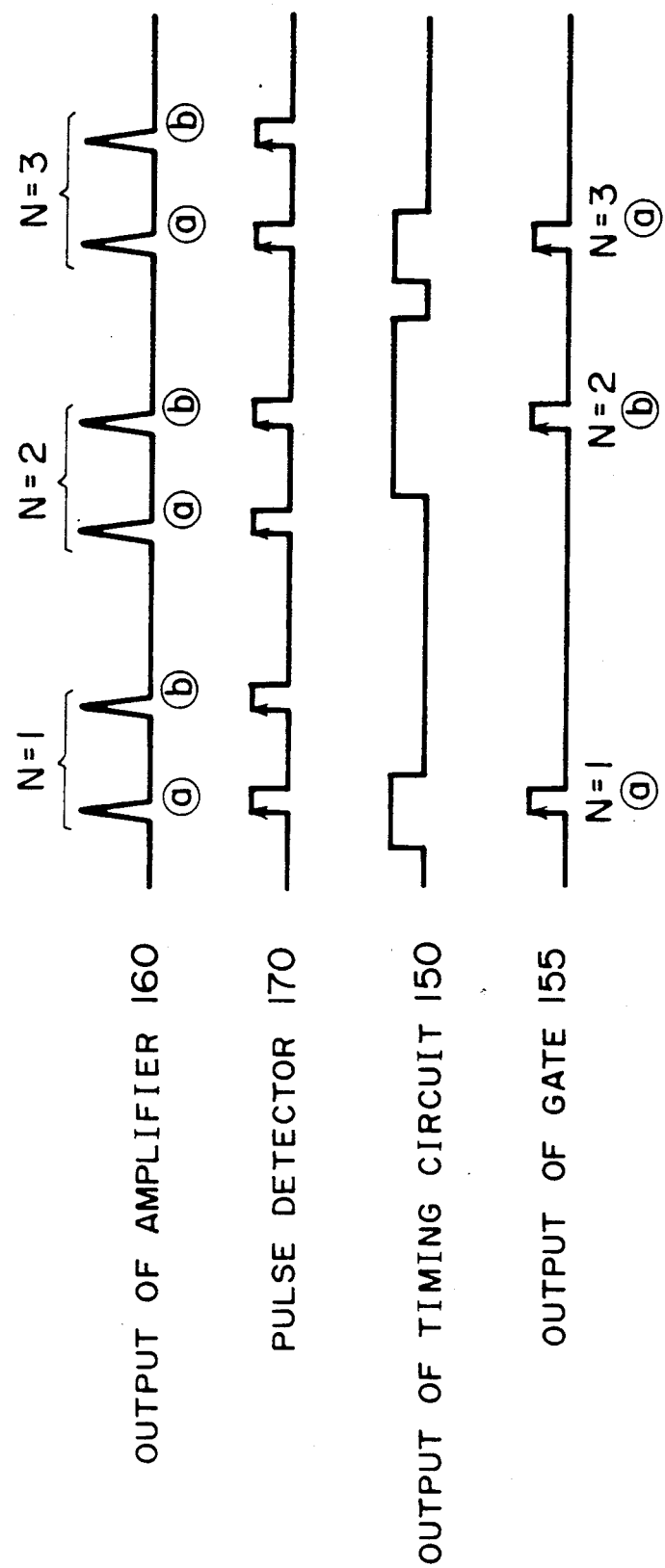
FIG. 7 is a graph illustrating a relationship between a timing circuit and a gate.

An example of construction wherein the delay time by the delaying optical fiber 8 is short and the condition of $$t_F - t_S < t_{AD} + t_{S/H} + t_{memory} \quad (9)$$

is satisfied will be described subsequently with reference to FIG. 6. The electric system in the present example includes a timing circuit 150 and a gate 155 in addition to the construction of the electric system shown in FIG. 3 which is an example which satisfies the condition of the equation (5) given hereinabove. Accordingly, since operation of the other part of the construction is similar to that of FIG. 3, description will be given mainly of operation of the timing circuit 150 and the gate 155. Since the delay time of the delaying optical fiber 8 is shorter than the conversion time of the analog to digital converter 300, sample holding and analog to digital conversion cannot be performed for all of internal reference light pulses (a) and external distance measurement light pulses (b). Therefore, such measurement as described below must necessarily be carried out. In particular, an output signal of the synthesizer 130 is forwarded to the timing circuit 150, counter 180 and CPU 600. The output signal acts upon the CPU 600 as a discriminating signal of a reception pulse but acts upon the counter 180 as a resetting signal while it acts upon the timing circuit 150 as a trigger signal. The timing circuit 150 develops such an output signal which causes the gate 155 to alternately open in response to a reception signal of an internal reference light pulse (a) and an external distance measurement light pulse (b) as shown in FIG. 7. In particular, in the case of N=1, the gate 155 is opened in response to an internal reference light pulse (a), but in the case of N=2, the gate 155 is opened in response to an external distance measurement light pulse (b), and then in the case of N=3, the gate 155 is opened in response to an internal reference light signal (a). Thus, the gate 155 forwards an output of the pulse detector 170 to the sample holding circuit 200 and the analog to digital converter 300 while the electric signal of the timing circuit 150 presents a high level. Accordingly, the sample holding circuit 200 sample holds an output signal of the band pass filter 190 alternately at timings of the internal reference light pulse (a) and the external distance measurement light pulse (b). In particular, in the case of N=1, the sample holding circuit 200 sample holds the output signal of the band pass filter 190 at the timing of an inner reference light pulse (a), but in the case of N=2, at the timing of an external distance measurement light pulse (b), and then in the case of N=3, at the timing of an internal distance measurement light pulse (a).

Then, the analog to digital converter 300 converts an output of the sample holding circuit 200 from an analog value into a digital value, and the digital value thus obtained is stored into a prescribed address of the memory 500. Data in the second or following cycles are added at the adder 400 and stored into the same memory address as in the first cycle.

Figure 8:
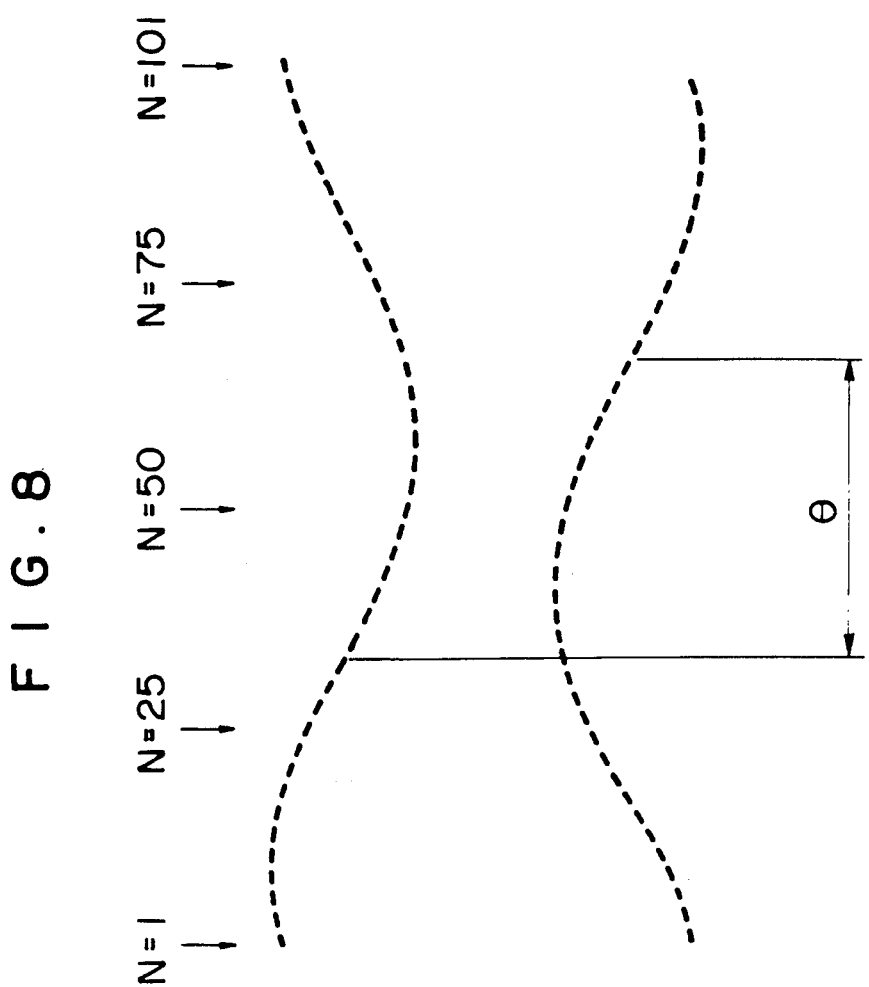
FIG. 8 is a graph illustrating data in a memory in the light wave distance measuring instrument shown in FIG. 6.

Subsequently, data in the memory 500 will be described with reference to FIG. 8. The axis of ordinate of FIG. 8 indicates data in the memory 500 while the axis of abscissa indicates an address of the memory 500. Compared with FIG. 5, the number of data obtained is 50 with respect to emission of N=101 pulses and is about half. This is because the gate 155 is opened alternately in response to an internal reference light pulse (a) and an external distance measurement light pulse (b). It is to be noted that the other processing is similar to that of the example shown in FIG. 3. Even if an internal reference light pulse (a) and an external distance measuring pulse (b) are sample held alternately in this manner, the pulses are located near to each other, and the change in drive is very small. Accordingly, an influence of it upon a measurement value obtained based on this is very small.

Third Example of Construction

Figure 9:
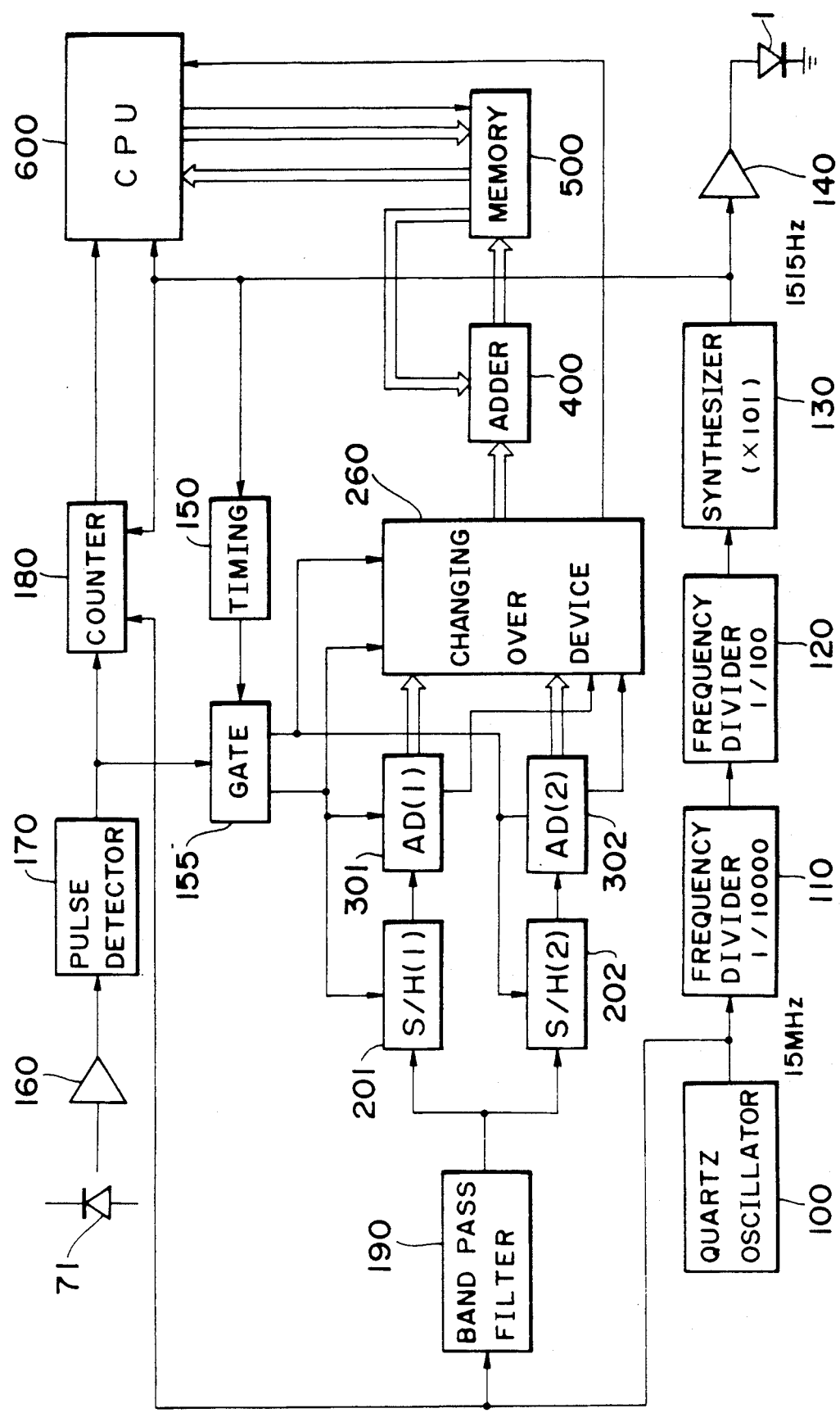
FIG. 9 is a block diagram showing a third example of construction of the light wave distance measuring instrument.

An example of construction wherein data can be obtained effectively from emission of pulses even in the case of a condition that the delay time by the delaying optical fiber 8 is short and the condition $$t_F - t_S < t_{AD} + t_{S/H} + t_{memory} \quad (9)$$

is satisfied will be described with reference to FIG. 9. The example of construction includes first and second sample holding circuits 201 and 202, first and second analog to digital converters 301 and 302, and a changing over device 260 in addition to the construction of FIG. 6 which is the second example of construction. In the present example of construction, a signal of an internal reference light pulse (a) and another signal of an external distance measurement light pulse (b) developed from the pulse detector 170 are changed over by the timing circuit 160 which operates in response to a signal from the synthesizer 130. In the case of, for example, N=1, if it is assumed that a signal of an internal reference light pulse (a) is transmitted to the first analog to digital converter 301 by way of the first sample holding circuit 201 and then a signal of an external distance measurement light pulse (b) is transmitted to the second analog to digital converter 302 by way of the second sample holding circuit 202, then the first sample holding circuit 201 sample holds an output signal of the band pass filter 190 at the timing of the signal of the internal reference light pulse (a). Then, an output signal of the first sample holding circuit 201 is transmitted to the first analog to digital converter 301, by which it is converted from an analog value to a digital value. In this instance, the changing over device 260 selects an analog to digital conversion data signal and an analog to digital conversion completion signal which are output signals of the first analog to digital converter 301, and the analog to digital conversion completion signal is transmitted to the CPU 600 while the analog to digital conversion data signal is transmitted to the memory 500. The data signal is thus stored into a predetermined address of the memory 500. Subsequently, the changing over device 260 selects the second analog to digital converter 302. In this instance, the signal of the external distance measurement light pulse (b) is received, and when the second analog to digital converter 302 completes its analog to digital conversion, data obtained is stored into a prescribed address of the memory 500. Meanwhile, in case the signal of the external distance measurement light pulse (b) is not received then, it is waited that the second analog to digital converter 302 completes its analog to digital conversion, and then after an analog to digital conversion completion signal is developed, the data is stored into a prescribed address of the memory 500. In the case of N=2 corresponding to a next set of light pulses, the signal of the internal reference light pulse (a) is transmitted to the second analog to digital converter 302 by way of the second sample holding circuit 202. Then, the signal of the external distance measurement light pulse (b) is transmitted to the first analog to digital converter 301 by way of the first sample holding circuit 201. Accordingly, a combination of the first sample holding circuit 201 and the first analog to digital converter 301 and another combination of the second sample holding circuit 202 and the second analog to digital converter 302 are alternately selected in response to a light pulse signal received. Consequently, an error and a drift which arise from a dispersion in electric characteristic among the first and second sample holding circuits 201 and 202 and first and second analog to digital converters 301 and 302 can be removed. It is to be noted that data stored in the memory 500 are thereafter handled in a similar manner as in the first example of construction (FIG. 3) described hereinabove.

Fourth Example of Construction

Figure 10:
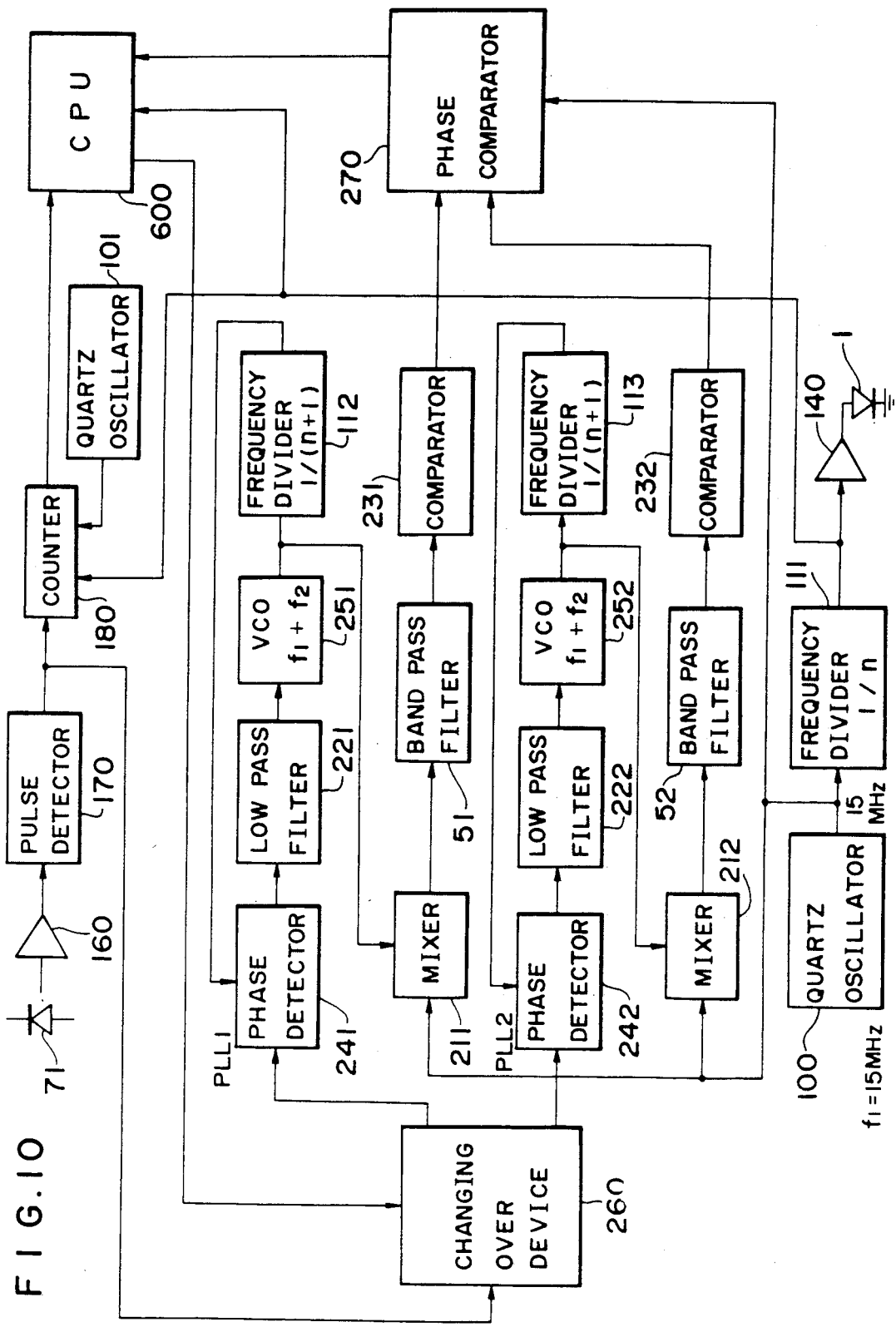
FIG. 10 is a block diagram showing a fourth example of construction of the light wave distance measuring instrument.

Subsequently, an example of construction wherein a PLL (phase locked loop) is formed by a reception pulse to measure an interval of time between pulses will be described with reference to FIG. 10. The principle of a light wave distance measuring instrument which employs a phase locked loop is disclosed in detail in connection with a delay time measuring instrument filed for patent by the present applicant (U.S. patent application Ser. No. 372,630).

The present example of construction includes, in addition to the construction of the first example of construction described hereinabove, a quartz oscillator 101 for rough estimation, first, second and third frequency dividers 111, 112 and 113, first and second mixers 211 and 212, first and second low pass filters 221 and 222, first and second comparators 231 and 232, first and second phase detectors 241 and 242, first and second voltage controlled oscillators (VCOs) 251 and 252, a changing over device 260, a phase comparator 270, and so forth. Accordingly, a first phase locked loop is constituted from the first phase detector 241, first low pass filter 221, first voltage controlled oscillator 251 and second frequency divider 112. Similarly, a second phase locked loop is constituted from the second phase detector 242, second low pass filter 222, second voltage controlled oscillator 252 and third frequency divider 113.

A signal of 15 MHz from the quartz oscillator 100 is forwarded to the first frequency divider 111, and an output signal of 3 KHz is forwarded from the first frequency divider 111 to the laser diode driver 140. The output of the frequency divider 111 is sent also to the counter 180 and the CPU 600 and acts upon the counter 180 as a resetting signal and upon the CPU 600 as a discriminating signal of a reception pulse. The laser diode driver 140 drives the laser diode 1 at the timing of the output signal of the first frequency divider 111. The laser diode 1 is a pulse laser diode, and a light pulse emitted from the laser diode 1 passes through the optical system shown in FIG. 1 and is received by the APD 71. At the APD 71, internal reference light pulses (a) and external distance measurement light pulses (b) are received at such timings as shown in FIG. 2. Each of such pulses is amplified suitably by the amplifier 160 and then waveform shaped by the pulse detector 170. An internal reference light pulse (a) of an output signal of the pulse detector 170 makes a starting signal but an external distance measurement light pulse (b) makes a stopping signal, and the counter 180 is controlled in operation. The counter 180 thus counts clocks of the quartz oscillator 101 for rough estimation for an interval of time from a starting signal to a stopping signal and then transmits rough estimation data to the CPU 600. Further, the output of the pulse detector 170 is separated by the changing over device 260 and outputted to the two first and second phase locked loop circuits.

For measurement for the first time, a pulse at the timing of the internal reference light pulse (a) is inputted to the first phase locked loop circuit constituted from the first phase detector 241, first low pass filter 221, first voltage controlled oscillator 251 and second frequency divider 112. Then, a pulse at the timing of the external distance measurement light pulse (b) is inputted to the second phase locked loop circuit constituted from the second phase detector 242, second low pass filter 222, second voltage controlled oscillator 252 and third frequency divider 113. The first phase locked loop circuit operates so as to be synchronized with the signal of the internal reference light pulse (a), and an output of the first voltage controlled oscillator 251 is mixed and detected with a signal from the quartz oscillator 100 by the first mixer 211. An output signal after such detection is sent to the first band pass filter 51, at which a dominant wave is extracted from the same, and the dominant wave is changed into a square wave of 3 KHz by the first comparator 231. The second voltage controlled oscillator 252, second mixer 212, second band pass filter 52 and second comparator 232 of the second phase locked loop operate in a similar manner in response to an external distance measurement light pulse (b) so that the second comparator 232 outputs a square wave of 3 KHz.

The difference in phase between the comparator 231 connected to the first phase locked loop and the other comparator 232 connected to the second phase locked loop corresponds to a difference in time between a signal of the internal reference light pulse (a) and another signal of the external distance measurement light pulse (b). The phase comparator 270 counts the phase difference with clocks of the quartz oscillator 100 and forwards its count data to the CPU 600. At the CPU 600, a rough measurement value by the counter 180 and a precision measurement value from the phase detector 270 are synthesized to calculate a measurement value by subtracting a value arising from a delay by the delaying optical fiber 8 and so forth.

In measurement for the second time, a pulse at the timing of the internal reference light pulse (a) is forwarded to the second phase locked loop, and another pulse at the timing of the external distance measuring pulse (b) is inputted to the first phase locked loop. After then, similar measurement to the first measurement is performed. Accordingly, distance measurement data is given as an average of measurement data of the first and second measurements. A possible error and drift which may arise from a dispersion of electric characteristics of a phase locked loop, a mixer, a band pass filter, a comparator and so forth can be cancelled by alternately changing over the phase locked loops in this manner.

Figure 11:
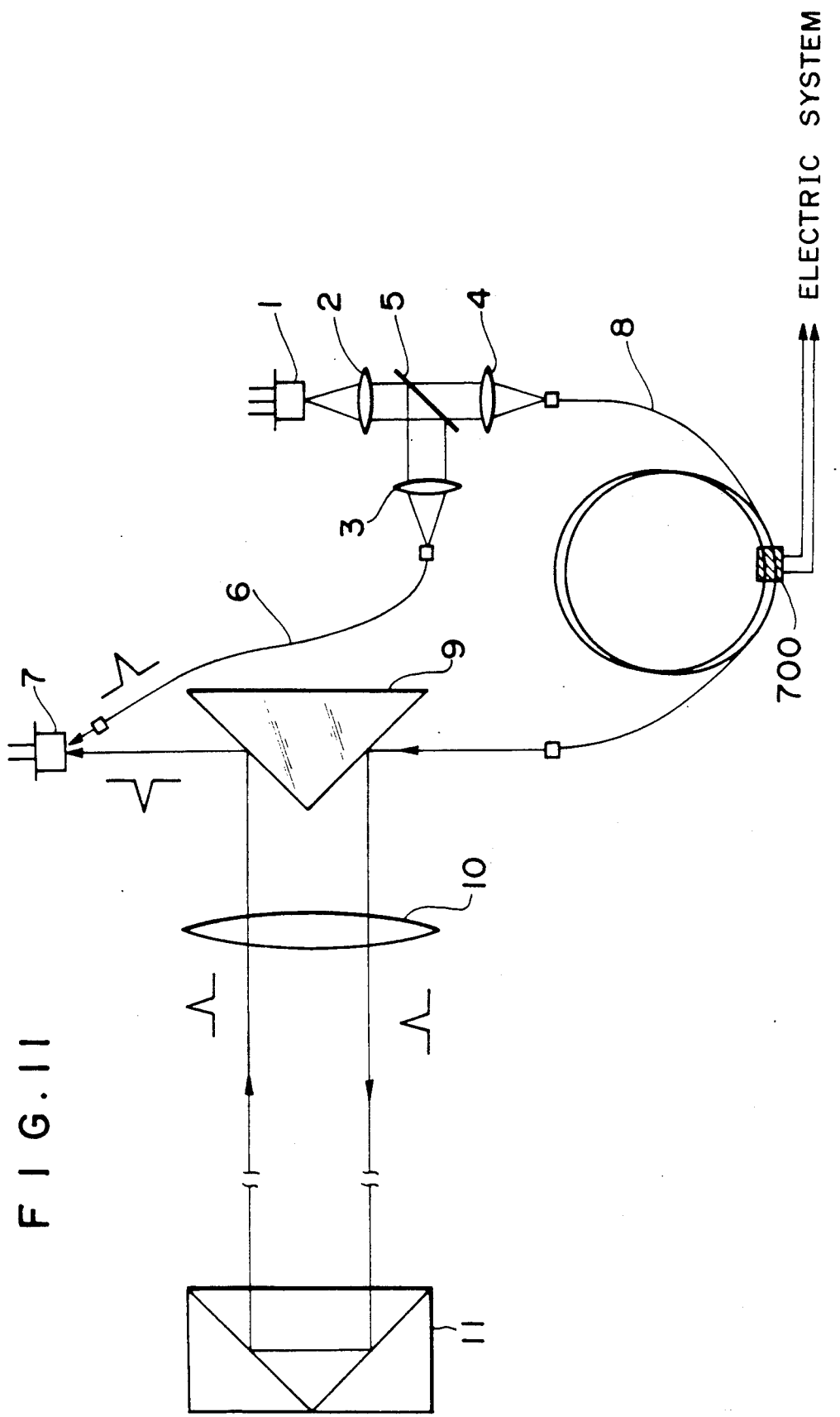
FIG. 11 is a diagrammatic representation showing a light wave distance measuring instrument according to a second embodiment of the present invention which includes a thermistor for temperature compensation mounted thereon.

Subsequently, description will be given a little of consideration for a temperature change and so forth. In particular, another embodiment of a light wave distance measuring instrument of the pulse type wherein a thermistor 700 for temperature compensation is attached to a delaying optical fiber 8 will be described with reference to FIG. 11. Here, quartz, glass and acrylic resin which are used for the optical fiber have the following coefficients of thermal expansion:

| quartz | $5.5 \times 10^{-7}/°C.$ |
|---|---|
| glass | $100 \times 10^{-7}/°C.$ |
| acrylic resin | $8 \times 10^{-5}/°C.$ |

Where the delaying optical fiber 8 is long, there is the possibility that the length of the delaying optical fiber 8 may be varied by a change in temperature. In this instance, since such variation of the length has an influence on measurement data, a variation of the length of the delaying optical fiber 8 is calculated using temperature data obtained by means of the thermistor 700 in order to achieve suitable compensation of a value of data.

Figure 12:
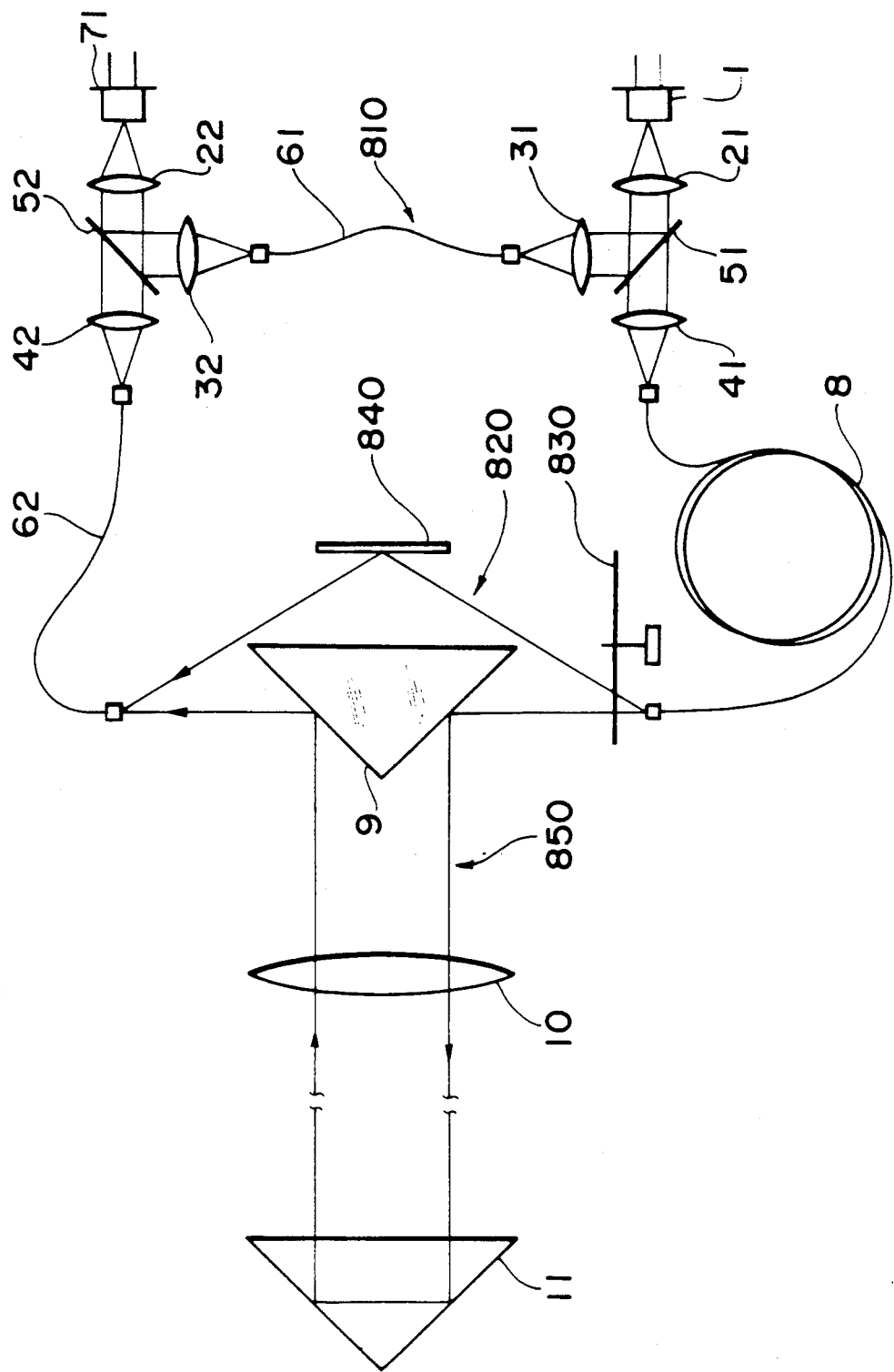
FIG. 12 is a diagrammatic representation showing a light wave distance measuring instrument according to a third embodiment of the present invention which includes a plurality of internal reference light passages to achieve temperature compensation.

Subsequently, a further embodiment of a light wave distance measuring instrument of the pulse type according to the present invention wherein a plurality of internal reference light passages are provided to compensate for a temperature characteristic of the delaying optical fiber 8 will be described with reference to FIG. 12.

A first internal reference light passage 810 is provided for the object of eliminating an electric drift occurring in the light wave distance measuring instrument as described hereinabove. A second internal reference light passage 820 is provided in order to compensate for a temperature characteristic of the delaying optical fiber 8. A light pulse emitted from the laser diode 1 is changed into a parallel beam of light by the lens 21 and split into two beams of light by the beam splitter 51. One of the two beams of light is condensed by the lens 31, introduced into the optical fiber 61 for an internal light passage, changed into a parallel beam of light by the lens 32, reflected by another beam splitter 52 and received by the APD 71 by way of the lens 22. The light passage serves as the first internal reference light passage 810. The other light passage is a passage of light condensed by the lens 41 and introduced into the delaying optical fiber 8, and a light pulse is delayed by the delaying optical fiber 8. Then, a light pulse going out from the delaying optical fiber 8 is changed over between two light passages by a chopper 830. In particular, in one of the two light passages after the chopper 830, a light pulse is reflected by an internal mirror 840, introduced into an optical fiber 62 for an internal light passage, then converted into a parallel beam of light by a lens 42, condensed, after passing through the beam splitter 52, by the lens 22 and introduced into the APD 71. Such light passage constitutes the second internal reference light passage 820. In the other light passage after the chopper 830, a light pulse is reflected by the prism 9, projected from the lens 10 to the outside of the body of the light wave distance measuring instrument, reflected by the corner cube 11, then received by the lens 10, reflected by the prism 9, introduced into the optical fiber 62 for an internal light passage, and received by the APD 71 by way of the lens 42, beam splitter 52 and lens 22. Such light passage constitutes the external distance measurement light passage 850.

Measurement is first carried out in a condition wherein the chopper 830 selects the second internal reference light passage 820. At the APD 71, at first a light pulse from the first internal reference light passage 810 is received, and then another light pulse from the second internal reference light passage 820 is received. A measurement value obtained in this condition is denoted by $L_1$. Then, measurement is carried out in another condition wherein the chopper 830 selects the external distance measurement light passage 850. A measurement value obtained in this condition is denoted by $L_2$. Thus, the distance L from the body of the light wave distance measuring instrument to the corner cube 11 is represented as $$L = L_2 - L_1$$

It is to be noted that a variation of the delaying optical fiber 8 by a temperature is so moderate with respect to time that it can be removed sufficiently with a changing over frequency available with a mechanical chopper (several Hz or so).

Since the light wave distance measuring instrument of the present embodiment having such a construction as described above employs an internal reference light pulse (a) as a reference signal, an internal electric signal need not be employed as a reference signal for measurement as in a conventional light wave distance measuring instrument. Accordingly, the influence of a drift arising from a delay time of the light emitting element driving circuit from the internal reference signal, a drift arising from a delay time of the driving circuit for the light emitting element, a drift of a response time of the light emitting element, and so forth, can be removed fundamentally. In this instance, the delaying optical fiber 8 may be inserted in either one of the internal reference light passage and the external distance measurement light passage.

It is to be noted that, where the delaying optical fiber 8 is inserted in the external distance measurement light passage, there is an effect that, even if the body of the light wave distance measuring instrument and the corner cube 11 are approached to each other to reduce the distance of the external distance measurement light passage, a light pulse from the internal reference light passage and another light pulse from the external distance measurement light passage will not overlap with each other.

As described so far, in a light wave distance measuring instrument of the pulse type according to the present invention, a light source means emits light in the form of pulses, and an external light passage introduces such pulse light to a light receiving means by way of an object for measurement. Then, an internal light passage introduces the pulse light to the light receiving means without passing the object for measurement. The light receiving means thus continuosly receives both of the pulse light having passed the internal light passage and the pulse light having passed the external light passage and forms an output signal. Then, a signal discriminating means discriminates, from the output signal of the light receiving means, first light signals having passed the internal light passage and second light signals having passed the external light passage. Then, a calculating means calculates, in response to discrimination of the signal discriminating means, a distance from a difference in time between adjacent ones of the first light signals and the second light signals. Particularly, the light receiving means can continuously receive both of light having passed the internal light passage and light having passed the external light passage and form an output signal, and the calculating means can form first signals corresponding to the light pulses having passed the internal light passage and second signals corresponding the light pulses having passed the external light passage. Further, according to the present invention, the light source means periodically emits pulses of light, and the light receiving means forms first signals corresponding to the light pulses having passed the internal light passage and second signals corresponding to the light pulses having passed the external light passage. Then, a periodic signal forming means alternately forms a first periodic signal and a second periodic signal in response to the first signals and the second signals, respectively, and the calculating means can calculate a distance from a difference in phase between the first and second periodic signals. Particularly, a reference signal forming means forms a reference signal having a period a little different from the period of emission of light of the light source means, and the periodic signal forming means can sample the reference signal at the timing of the first signal to form the first periodic signal and can sample the reference signal at the timing of the second signal to form the second periodic signal. Further, the periodic signal forming means can form the first periodic signal synchronized with the first signal and can form the second periodic signal synchronized with the second signal. Then, a delaying means for delaying a light signal can be inserted in the external light passage in order to delay a light pulse in the external light passage.

Thus, according to one aspect of the present invention, a light wave distance measuring instrument comprises a light receiving means for normally receiving both of light from a light source means having passed an internal light passage and light from the light source means having passed an external light passage to form an output signal, and a calculating means for calculating a distance from a difference in time between adjacent ones of first and second light signals in an output signal of the light receiving means. Accordingly, the distance can be calculated from a time difference between adjacent ones of the first and second light signals, and the influence of an electric drift can be reduced. Here, where the calculating means is constituted such that it may measure a difference in time between the first and second light signals originating from light emitted at a time from the light source means, there is an effect that the influence of an electric drift can be eliminated completely.

According to another aspect of the present invention, a light wave distance measuring instrument comprises a light source means for periodically emitting pulses of light, a light receiving means for receiving both of pulse light which has passed an internal light passage and pulse light which has passed an external light passage to form a first signal and a second signal, respectively, a periodic signal forming means for alternately forming a first periodic signal and a second periodic signal in response to part of the first signal and part of the second signal, respectively, and a calculating means for calculating a distance from a difference in phase between the first periodic signal and the second periodic signal. Accordingly, first and second periodic signals can be formed alternately in response to part of the first signal and part of the second signal, respectively, and the influence of an electric drift can be reduced. Further, since periodic signals are formed from the first signal and the second signal, the resolution of the instrument can be improved readily.

Further, where a delaying means for delaying a light signal is provided for the external light passage, the distance between the pulse light having passed the internal light passage and the pulse light having passed the external light passage is increased, and consequently, even in distance measurement in the case of a short distance, the pulse light having passed the internal light passage and the pulse light having passed the external light passage can be detected in a separated condition from each other. Accordingly, there is an excellent effect that expansion of the range of measurement to a short distance can be attained.

I claim:

1. A light wave distance measuring instrument of the pulse type comprising:
   signal generating means for providing a reference signal of a reference frequency and an output driver signal of a frequency different from said reference frequency;
   light source means, coupled to said signal generating means, for periodically emitting pulses of light in response to said output driver signal;
   beam splitter means, optically coupled to said light source means, for optically separating said pulses of light into internal reference light pulses and external measurement light pulses;
   external passage light coupling means, optically coupled to said beam splitter means, for coupling said external measurement light pulses toward an external object at distance to be measured and for receiving reflected light pulses from said external object;
   internal passage light coupling means, optically coupled to said beam splitter means, for coupling said internal reference light pulses without reflection from said external object;
   light pulse receiving means, responsive to said internal reference light pulses and said reflected light pulses, for converting said light pulses into internal pulse timing signals and reflected pulse timing signals, respectively;
   sampling means, coupled to said light pulse receiving means and said signal generating means, for providing a first signal representing sampling of said reference signal at the timing of said internal pulse timing signals and a second signal representing sampling of said reference signal at the timing of said reflected pulse timing signal; and calculating means, coupled to said sampling means, for determining the distance to said external object based on phase difference between said first and second signals representing sampling of said reference signal.

2. A light wave distance measuring instrument according to claim 1, wherein said external passage light coupling means includes optical delay means for introducing an additional delay in the coupling of said external measurement light pulses.

3. A light wave distance measuring instrument according to claim 1, wherein said external passage light coupling means includes optical fiber delay means for providing a delay in the coupling of said external measurement light pulses of a duration greater than the duration represented by the width of said light pulses.

4. A light wave distance measuring instrument according to claim 1, wherein said output driver signal is provided by said signal generating means at a frequency equal to said reference frequency multiplied by a constant factor.

5. A light wave measuring instrument according to claim 1, additionally comprising pulse counter means wherein said calculating means is arranged to determine said distance to said external object by first making a rough determination of distance based on a count of elapsed pulses and then making a final determination of distance based on said phase difference determination.

6. A light distance measuring instrument of the pulse type, comprising:

signal generating means, including a reference oscillator for providing a reference signal of a reference frequency and means for deriving from said reference signal an output driver signal of a frequency equal to said reference frequency multiplied by a constant factor;

a light source means, coupled to said signal generating means, for periodically emitting light pulses of predetermined duration in response to said output driver signal;

beam splitter means, optically coupled to said light source means, for optically separating said pulses of light into internal reference light pulses and external measurement light pulses;

external passage light coupling means, optically coupled to said beam splitter means and including optical fiber delay means for providing a delay greater than said light pulse duration, for directing said external measurement light pulses toward an external object at a distance to be measured and for receiving reflected light pulses from said external object;

internal passage light coupling means, optically coupled to said beam splitter means, for coupling said internal reference light pulses without reflection from said external object;

light pulse receiving means, responsive to said internal reference light pulses and said reflected light pulses, for converting said light pulses into internal pulse timing signal and reflected pulse timing signals, respectively;

sampling means, coupled to said light pulse receiving means and said reference oscillator, for providing a first signal representing sampling of said reference signal at the timing of said internal reference pulse timing signals and a second signal representing sampling of said reference signal at the timing of said reflected pulse timing signals; and calculating means, coupled to said sampling means, for determining the distance to said external object based on phase difference between said first and second signals representing sampling of said reference signal.

* * * * *